Patented Jan. 20, 1931

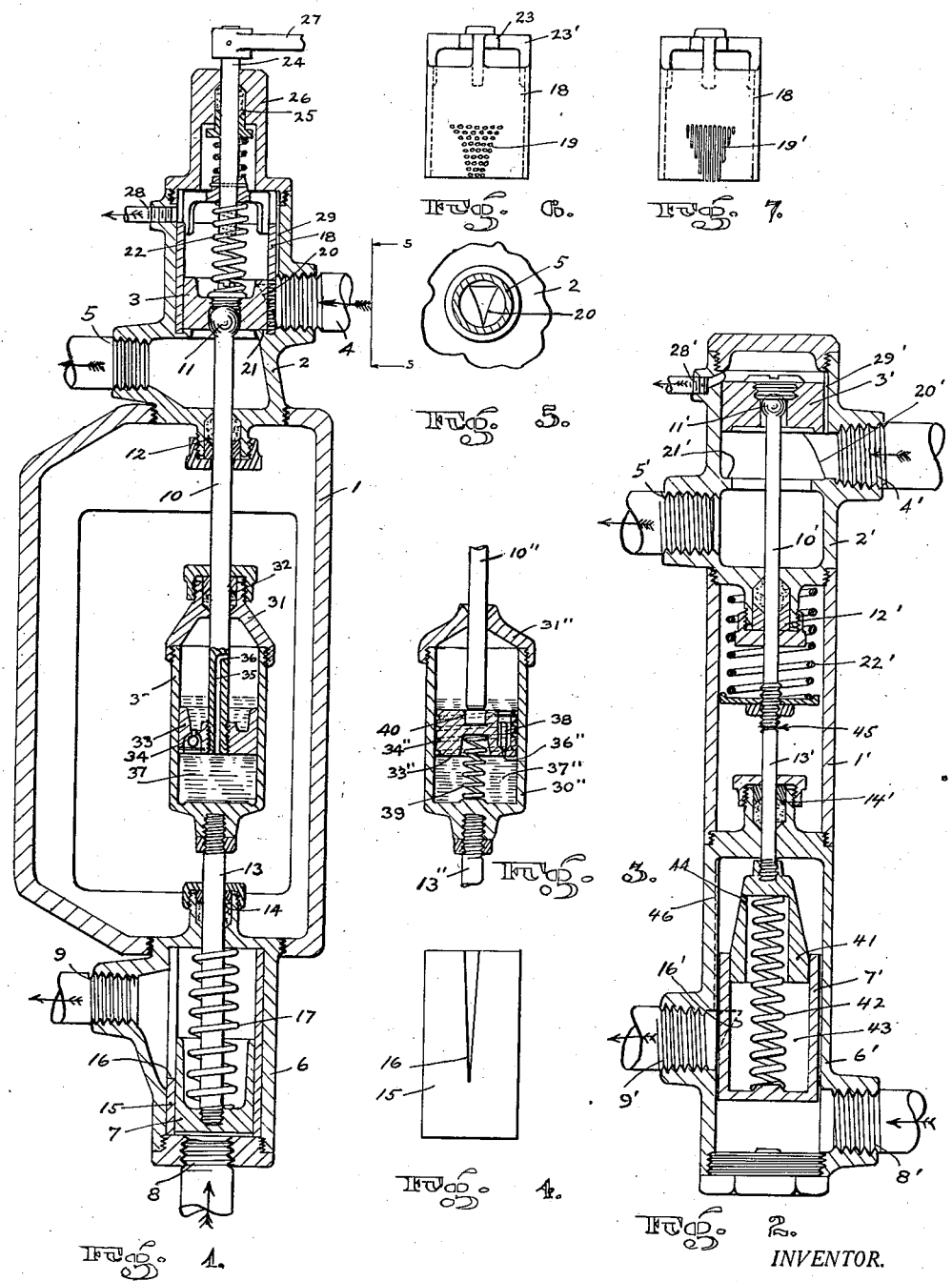

1,789,547

UNITED STATES PATENT OFFICE

OTTO W. HAHN, OF SAN FRANCISCO, CALIFORNIA

AUTOMATIC GAS AND WATER REGULATOR FOR WATER HEATERS

Application filed April 30, 1928. Serial No. 273,820.

This invention relates to automatic gas and water regulators for water heaters and has for its objects simplified, durable construction of such devices as well as a regulator which will effect an improved control without the use of a thermostat.

Briefly described the improved regulator comprises a water piston and gas valve combination adapted to be interposed in the water and gas pipe lines leading to a gas water heater, and operated by varying the water pressure against the water piston upon opening or closing a water faucet connected with the hot water coils of the heater.

The improved control effected by my regulator operates as follows:

By opening the water faucet (from the heating coils) fully or partially it—

A. Automatically opens the gas fuel valve side and simultaneously boosts the pilot light over the burner.

B. Delays any water delivery through the heater coils and open faucet (except small leakage) until water in heating coils has had time to heat under substantially full supply of gas.

C. Automatically increases the flow of water (running hot) to the amount determined by the opening of the faucet.

D. Automatically lowers or raises the gas flame in proportion to the flow of water and shuts off the fuel when the faucet is closed.

E. Upon closing the faucet after the water is hot, and then partially opening it again, the first, second and third operations above scheduled do not repeat themselves (except for the pilot action) but the gas flame flares up only in proportion to the opening of the faucet (or somewhat in excess thereof and quickly adjusts itself backward to the requirements) and the water also runs in proportion to the opening of the faucet.

F. After allowing faucet to remain shut off until the water heating coils cool off and then opening the faucet either full or slightly the regulator functions again in the order described.

G. With cold water heating coils, upon first opening the faucet partially it at once opens the gas valve fully and after heating the water it works backward on the gas supply reducing same to the actual requirements.

H. It operates on water and gas metering orifices so generated that the gas and water delivery are always proportioned (after the initial preheating of the water).

I. It is provided with means accessible from outside of the regulator for raising or lowering the proportion of gas delivery to water delivery which once set remains constant throughout the range of operation of the regulator.

Other patents on similar regulators with which I am familiar are as follows: Humphrey, 791,028; Pitcher, 895,584; Diehl, 1,057,625; Betker, 1,108,321; Ruud et al., 1,257,932; Stack, 1,292,912; Hamilton, 1,442,145; Hartmann, 1,644,127.

But in none of the above do the sequential operations A to D above defined take place, nor do any function as in E, F and G, nor have they the features H, I.

In the drawings accompanying this application Fig. 1 is a longitudinal section through the preferred form of my gas water regulator showing all important features.

Fig. 2 is a view similar to that of Fig. 1 but showing a modified structure having the same mode of operation.

Fig. 3 is a longitudinal section showing a modification of the retarding element used in the construction of Fig. 1.

Fig. 4 is an elevation of the water metering discharge port or generated orifice as used in the construction of Fig. 1.

Fig. 5 is an elevation of the gas metering discharge port or generated orifice as used in the construction of Fig. 1.

Fig. 6 is a detached view of the gas valve sleeve showing the adjustable gas metering orifices used in the construction of Fig. 1.

Fig. 7 shows a modified form of the adjustable gas metering orifices.

Since the construction in Figs. 1 and 2 function in the same manner the corresponding parts of each are similarly numbered except that prime marks are used with the duplicate numbers used in Fig. 2.

Both Figs. 1 and 2 show a regulator with the gas end on top and the water end at the bottom with gas and water valves in line operating through aligned stems.

In the figures, 1 is a frame or spacing member to the upper end of which is threadedly secured the body 2 of a gas valve 3 adapted for controlling the flow of gas from an inlet 4 to an outlet 5 for heating any type of quick acting (so called instantaneous) water heater not shown, while at the lower end of the spacing member 1 is threadedly secured the body 6 of a water valve 7 adapted to control water from an inlet 8 to an outlet 9 leading to the water heater, and from which heater the hot water is drawn off as required from any of the service faucets served thereby.

The valves 3 and 7 are of the piston variety each slidable in a suitable cylindrical chamber in its valve body and the gas valve is provided with a stem 10 connected thereto by a ball and socket joint 11, and the stem passing through a stuffing box 12, while the water valve 7 is provided with a stem 13 also extending through a stuffing box 14 and in alignment with the gas valve stem 10.

Water valve 7 preferably operates in a sleeve 15 pressed into the body 6 and provided with a specially formed or generated water metering orifice 16 as best shown in Fig. 4, and the piston valve 7 normally closes this orifice through action of a spring 17 which forces it in a direction away from the gas end of the regulator.

Gas valve 3 operates within a rotatable sleeve 18 provided at one side with a series of holes 19 (as best shown in Fig. 6) which when in place fall directly over a generated gas metering discharge orifice 20 formed in the wall of the body 2 at the point of inlet 4, and the valve 3 normally shuts off the supply of gas from inlet 4 to outlet 5 by seating on valve seat 21 through pressure of a spring 22 reacting between the valve piston and a hub 23 carried by a spider 23′ on the sleeve 18.

Sleeve 18 may be rotated within the valve body by means of a round stem 24 secured by a pin or otherwise in the hub of the sleeve, and the stem extends through a stuffing box 25 in a bonnet 26 screwed to the open end of the valve body 2 over the sleeve.

The outer end of the stem is provided with a handle 27 by means of which the sleeve 18 may be turned from outside of the valve body without interrupting the operations of the regulator.

At one side of the gas valve body 2 is a pilot outlet 28 which is always open through a pilot duct 29 formed in the wall of the body 2 to the gas supply inlet 4 so that the pilot always burns, and since there is a considerable volume of gas within the chamber formed by sleeve 18 it follows that upon any sudden upward push of the gas piston valve 3 the entrapped gas will be urged with additional force out of the pilot outlet, thus boosting the pilot at any upward or opening movement of the gas valve.

Surrounding the adjacent ends of the valve stems 10 and 13 is a timing device herein called a retarder and which comprises a cylindrical shell 30 screwed at its lower end to the upper end of water valve stem 13, and provided at its upper end with a threaded cover 31 fitted with a stuffing box 32 through which the gas valve stem 10 slidably extends.

At the lower end of stem 10 within shell 30 is a piston 33 provided with a very small relief valve 34 forming a communication between the upper and lower sides of the piston and so arranged that a pressure under it will lift and close the relief valve, while a void under it will enable the valve to fall open and open the communication.

Extending axially through the lower end of the stem 10 is a small bore 35 connected by a very small lateral or "bleed" hole 36 open to the chamber space above the piston 33.

In use a quantity of liquid, preferably oil 37, is maintained in the retarder shell and in reciprocation of the water and/or gas valve stems this oil is either forced upwardly through bore 35 into the upper part of the retarder chamber, or if already in upper chamber a downward movement of rod 13 producing a void under the piston 33 opens valve 34 and permits the oil to slowly drip through into the lower part of the chamber.

The operation of the device of Fig. 1 will now be described before explaining the modifications, the position of all parts in Fig. 1 being as if all water faucets were closed.

With the water, gas and pilot leads all connected to the mains and heater with pilot light burning and with all water faucets closed, the water piston valve being a free fit in its sleeve and permits seepage by its sides so that the water pressure is equalized and the spring 17 holds the piston down closing the discharge or metering orifice 16 and pulling the stem 13 and shell 30 of the retarder down as far as it will go leaving a space at the bottom of the retarder filled with oil 37, while at the upper or gas end of the regulator the spring 22 forces the gas valve 3 on its seat closing the gas inlet.

Upon opening a faucet the piston 7 is at once forced upward and on account of the oil in the retarder which acts as a solid body the gas valve is instantly lifted to full opening delivering full volume of gas to the heater burners and instantly boosting the pilot as before explained. However, no water flows from the faucet except slight seepage as the lower or metering end of valve 7 must first travel a distance (in the actual construction about three-fourths of an inch) before it begins to open the small end of the generated water discharge orifice 16 and to reach which point it must begin to force the oil through bleeder hole 36 into the upper space in the retarder device. The time this will take depends on the size of the bleeder hole and quantity and quality of oil used and is so calculated that it requires a short period just sufficient to enable the heater (meanwhile going full blast) to heat the water coils so that by the time the water port 16 begins to open or the water piston balances somewhere along the port the water will run hot, hence no waste through a lot of cold water running through the heater has taken place.

If the faucet is wide open the valve 7 will be forced to the limit of its stroke with water port 16 wide open and since all the oil in the retarder will now be in the upper part of the chamber the piston 33 will bottom and stem 10 will be held with the gas valve wide open, and if the faucet is now turned off a balanced water pressure in valve body 6 will ensue and both valves will act as a unit and close simultaneously through the force of their springs 17 and 22.

Also, should the faucet be opened and closed to various degrees with the water running hot, the balancing effect of the varying back pressure of the water will cause a balancing of the piston valve 7 to some intermediate point relative to its metering opening 16 and a similar position of the gas valve 3 relative to its metering opening 20. The shape of the metering gas and water opening being so generated that the relative proportions of gas to water delivery are at all times preserved with water say at 175° F., with a certain adjustment of the holes 19 thereover, and if it is desired to have the water hotter the sleeve 18 is rotated to bring more holes 19 over the opening to thus in effect enlarge it while maintaining its generated shape so that at all points of travel of both valves back and forth the proper proportions of gas and water will be maintained.

If with water running hot with faucet wide open, it is then closed, the force of spring 17 will move valve 7 beyond the final closing point of orifice 16 (about three-fourths of an inch) leaving all the oil in the retarder on the upper side of the piston 33, the lower portion being filled with air drawn through bleeder hole 36, and a quick reopening of the faucet will throw valve 7 upward compressing the air in the retarder and forming a cushion until it re-enters the upper part of the chamber through the bleeder hole.

If however, the faucet is permitted to remain closed the oil will slowly drip through relief valve 34 until it has filled the lower chamber, the relief valve being of such a size that the time for this to take place is made to equal about the length of time it would take for the water heater coils to cool off by radiation—say about a half hour or more—and at which time the heater coils being cold the operations of the regulator would all follow the schedule A. B. C. given in the brief description above.

Should the water coils be but partially cooled off, it follows that but part of the oil would have dripped into the lower chamber and upon opening the faucet fully the retarder would hold back the flow of water for a shorter time than though the water coils were entirely cooled off, or in other words the retarder will automatically hold back delivery of water until it is hot, and vary the delay period depending on how hot the water coils or other heating devices are at the start thus automatically delivering gas fuel to the heater in proportion to the requirements with substantially a thermostatic action, yet a more responsive action than possible to obtain with a thermostat and entirely free from any thermostat troubles.

The retarder or timing element shown in Fig. 3 operates similarly to that shown in Fig. 1 and similarly consists of a cylindrical shell and other parts surrounding the two ends of the valve stems, all those parts having a similar function to the device of Fig. 1 being similarly numbered followed by double prime marks.

The principal difference being that the bleed hole 36″ is in this case closed by a very small gravity needle valve 38, and the relief or return opening for the oil 37″ takes the form of a very small spiral groove 34″ around the piston 33″, while a spring 39 within the retarder normally forces the piston upward creating a space beneath the piston into which the oil (squeezed into the upper chamber by the initial movement) slowly returns through the groove 34″. With this arrangement no air cushion is had when the stems are separated before piston 33″ has been fully lifted by spring 39, but an oil sump 40 formed in the upper end of the piston receives the lower end of the gas valve stem 10″ forming a dash pot.

In the construction shown in Fig. 2 the gas orifice adjusting sleeve has been omitted for simplification of the drawing, and the retarder feature is incorporated in the water end of the regulator, taking the form of a plunger 41 operating within the hollow cup-like water piston 7′ and normally forced apart by a compression spring 42 so that the space 43 within is filled with water drawn through a bleeder hole 44 in the plunger.

In this showing the stems 10′ and 13′ of the gas and water valves are in aligned abutting relation at 45 and the gas valve stem is forced by spring 22′ downward to close the valve.

The water delay action of the device of Fig. 2 is substantially the same as that shown in Fig. 1, the liquid in space 43 acting as a solid upon initial movement of the plungers 7 and 41 and the gradual collapse of plungers ejecting the water through bleed hole 44 through a by-pass groove 46 to a negligible discharge through the open faucet until the lower end of plunger 7' opens the lowest or leading end of generated water discharge orifice 16'. The return of liquid through bleed hole 44 (upon closing the faucet more or less) is slower than its ejection owing to its being effected by spring 42 which is much weaker than the water pressure operating on the lower end of plunger 7' when the faucet is opened with consequent drop of back pressure. In Fig. 2 the position of all parts is as if the water faucet had just been opened, gas valve opened fully, and water orifice not yet uncovered.

With respect to the adjustable sleeve 18 of Figs. 1 and 6 for changing the effective area of the gas inlet port while maintaining its generated form, the group of holes 19 having the outline of the generated form desired and being revolved with the sleeve within the casing or body provided with a fixed port or plain opening of similar form acts as a shutter for closing off some or of exposing more holes to the port, with the effective form of the port as a whole being preserved by the angular or curved termination of the group.

The holes 19 may be of any size or graduated as well from right to left or slots may be used as shown at 19' in Fig. 7.

Having thus described my invention what I claim is:

1. A gas and water regulator for a gas water heater comprising a fuel valve and a water valve, means whereby the two valves are simultaneously operated through water pressure upon a drop in water pressure on one side of the water valve through opening of a water discharge therefrom, retarding mechanism transmitting motion from the water valve to the gas valve arranged and adapted to retard the water valve from opening until the gas valve port has been opened for a period of time sufficient to preheat the water in the heater.

2. In a gas and water regulator for a quick water heater, a water valve and a gas valve, means by which both valves are operated through water pressure on the water valve, a retarder interposed between the two valves adapted for retarding the opening of the water valve until the gas valve has been opened fully for a period of time.

3. In a gas and water regulator for a quick water heater, a water valve and a gas valve, means by which both valves are operated through water pressure on the water valve, a retarder interposed between the two valves adapted for retarding the opening of the water valve until the gas valve has been opened fully for a period of time, and means preventing a repetition of said retarder's action until a lapse of time.

4. In a gas and water regulator for a quick water heater, a water valve and a gas valve, means by which both valves are operated through water pressure on the water valve, a retarder interposed between the two valves adapted for retarding the opening of the water valve until the gas valve has been opened fully for a period of time, and means preventing a repetition of said retarder's action until a lapse of time calculated for the cooling of said water heater when gas is shut off.

5. In a gas and water regulator for a quick water heater, a water valve operated by unbalanced pressure thereon, a gas valve, stems on both valves, and fluid controlled means embracing the ends of said stems arranged and adapted to transmit motion from the water valve stem to the gas valve stem.

6. In a gas and water regulator for a quick water heater, a water valve operated by unbalanced pressure thereon, a gas valve, stems on both valves, and fluid controlled means embracing the ends of said stems arranged and adapted to transmit motion from the water valve stem to the gas valve stem and for retarding the movement of the water valve stem relative to the movement of the gas valve stem.

7. In a gas and water regulator for a quick acting water heater, a piston water valve operated by unbalanced pressure thereon, a piston gas valve, stems on both valves, means whereby the movement of one stem will operate the other stem comprising a fluid chamber secured to one stem and slidably embracing the other stem, a piston slidable within said chamber against which said other stem engages and means for controlling the flow of a fluid from one side of said piston to the other side.

8. In a gas and water regulator for a quick acting water heater, a piston water valve operated by unbalanced pressure thereon, a piston gas valve, stems on both valves, means whereby the movement of one stem will operate the other stem comprising a fluid chamber secured to one stem and slidably embracing the other stem, a piston slidable within said chamber against which said other stem engages and means for controlling the flow of a fluid from one side of said piston to the other side arranged and adapted to permit a much faster flow of said fluid toward one side of the piston than toward the opposite side.

9. In a gas and water regulator of the character described a body having a through gas passage with an inlet and an outlet, a piston type gas valve normally closing the gas passage, means for opening said valve by water pressure, a sleeve in which said piston is reciprocable revolubly positioned in said body and ported coincidentally with its inlet, and means accessible exterior to the body whereby said sleeve may be revolved to vary the effective opening of said inlet.

10. In a gas and water regulator of the character described a body having a through gas passage with an inlet and an outlet, a piston type gas valve normally closing the gas passage, means for opening said valve by water pressure, a sleeve in which said piston is reciprocable revolubly positioned in said body and ported coincidentally with its inlet, and means accessible exterior to the body whereby said sleeve may be revolved to vary the effective opening of said inlet, the port in said sleeve comprising a group of small openings arranged and adapted for bringing more or less over the port in the body.

11. In a gas and water regulator of the character described a body having a through gas passage with an inlet and an outlet, a piston type gas valve normally closing the gas passage, means for opening said valve by water pressure, a sleeve in which said piston is reciprocable revolubly positioned in said body and ported coincidentally with its inlet, and means accessible exterior to the body whereby said sleeve may be revolved to vary the effective opening of said inlet, the port in said sleeve comprising a group of small openings arranged and adapted for bringing more or less of the openings over the port in the body and the shape of said group as a whole cooperating with the shape of the port in the body to provide a metering orifice for the gas.

12. In a gas and water regulator for a gas water heater, a water valve and a gas valve, said gas valve provided with a piston body, and a cylinder in which the piston works, means whereby the two valves are operated for controlling flow of water and gas to the heater, an open pilot gas lead to the heater from the outer end of said cylinder and a duct supplying gas to said cylinder from a source of supply, the arrangement being such that upon opening movement of the gas valve its piston body will force an extra amount of gas from said cylinder through said pilot lead.

13. In a gas and water regulator for a gas water heater, a normally closed spring actuated water valve to control flow of water through the heater, said valve arranged to be opened by water pressure upon reduction of back pressure therefrom, a normally closed spring actuated gas valve arranged to control flow of fuel gas to the heater, a connection between the two valves whereby the gas valve will be opened by movement of water valve, the setting of the valves being such that the gas valve will be opened fully before substantial opening of the water valve, said connection between the valves arranged to yield to the closing action of the gas valve for automatically reducing the gas valve opening from initial full open position commensurate with the reduction of back pressure and consequent position of said water valve.

OTTO W. HAHN.